United States Patent
Gumpoltsberger

(10) Patent No.: US 7,255,018 B2
(45) Date of Patent: Aug. 14, 2007

(54) TRANSMISSION WITH LOW SHAFT DEFLECTION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 183 days.

(21) Appl. No.: 10/946,519

(22) Filed: Sep. 21, 2004

(65) Prior Publication Data
US 2005/0061093 A1  Mar. 24, 2005

(30) Foreign Application Priority Data
Sep. 23, 2003 (DE) .................. 103 43 993

(51) Int. Cl.
*F16H 3/08* (2006.01)
(52) U.S. Cl. .................. 74/331; 74/329; 74/333
(58) Field of Classification Search .................. 74/325, 74/329, 331, 333, 410, 421 R, 457
See application file for complete search history.

(56) References Cited

U.S. PATENT DOCUMENTS

| | | | | |
|---|---|---|---|---|
| 2,320,757 A | * | 6/1943 | Sinclair et al. | 74/337 |
| 5,421,216 A | * | 6/1995 | Stine | 74/331 |
| 6,164,149 A | * | 12/2000 | Ohmori et al. | 74/336 R |
| 6,205,879 B1 | * | 3/2001 | Litvin et al. | 74/457 |
| 6,427,550 B1 | * | 8/2002 | Bowen | 74/336 R |
| 6,766,705 B1 | * | 7/2004 | Hall, III | 74/331 |
| 6,883,394 B2 | * | 4/2005 | Koenig et al. | 74/335 |
| 2004/0093972 A1 | | 5/2004 | Gumpoltsberger et al. | |

FOREIGN PATENT DOCUMENTS

DE        3822330 A1  *  7/1989
DE     102 53 259 A1     5/2004

* cited by examiner

*Primary Examiner*—David D. Le
(74) *Attorney, Agent, or Firm*—Davis Bujold & Daniels, P.L.L.C.

(57) ABSTRACT

A transmission (1) having at least one transmission input shaft (4), at least one countershaft (5), one reverse gear shaft (30) and at last one transmission output shaft (6) in which, upon at least one transmission input shaft and at least one countershaft, idler gears designed as helical-cut spur gears are supported and fixed gears are fastened which forming gear pairs are in tooth contact with each other, and having shifting sets (32, 33, 34, 35) situated on the transmission input shaft and the countershaft. To implement a low shaft deflection, it is posed that the helix angles (39, 40, 42, 43) of the toothings of gear wheels (21, 22, 24, 25) driving the countershaft and the helix angle (41) of the driven gear wheel (23) on the countershaft be selected so that the toothing forces and bending torques resulting therefrom which act on the countershaft dissolve at least partly in relation to the shaft.

15 Claims, 2 Drawing Sheets

TRANSMISSION WITH LOW SHAFT DEFLECTION

This application claims priority from German Application Serial No. 103 43 993.5 filed Sep. 23. 2003.

FIELD OF THE INVENTION

The invention relates to a transmission with low shaft deflection.

BACKGROUND OF THE INVENTION

In the prior art are known both dual-clutch transmissions and transmissions having only one starting and gear clutch which are in countershaft design. In the last mentioned transmission, paraxially with a transmission input shaft connected with the output side of the starting and gear clutch, one countershaft is situated upon which idler and fixed gears are rotatably supported or fastened. At the same time, the idler and fixed gears are in tooth contact with each other forming by pairs one reduction step.

To carry out a concrete ratio change operation, the idler gears can be decelerated with the aid of synchronization means to the rotational speed of the shaft upon which they are supported. Besides, with the idler gears coupling means are coordinated which are disposed non-rotatably and axially displaceably upon the respective transmission shaft. During a concrete gear shift operation with rotational speed uniformity, the coupling means non-rotatably connect the gear specific idler gear with the transmission shaft concerned. The synchronization and coupling means are, in addition, combined to form units with which preferably each two adjacent idler gears can be shifted. The units are also known as shifting sets.

The idler gears of said gear wheel pairs accordingly drive the countershaft alternatively to each other. This countershaft has available for the output one driven gear wheel non-rotatably connected therewith. The driven gear wheel is for its part in tooth contact with a fixed gear upon one output shaft with which can be driven at least one differential transmission of a vehicle drive train.

Especially in multi-ratio transmission, it is advantageous to support the transmission input shaft and the countershaft not only by their respective axial ends by means of roller bearings, but also to situate an additional central bearing approximately in the center of said shafts.

In such a transmission known from the not pre-published DE 102 53 259.1, the driven gear wheel can be fastened upon the countershaft either in a gear wheel group between the roller bearings close to the clutch and the central bearing or in a gear wheel group between the central bearing and the roller bearings removed from the clutch.

In vehicle transmissions, gear wheels designed as helical-cut spur gears are preferred, since they have, in comparison with straight-cut gear wheels, a smoother run and low noise formation. The disadvantage of helical-cut gear wheels is that their toothing forces exert an axial thrust upon the respective transmission shaft and produce bending torques related thereto.

At this point, the invention establishes that the problem to be solved is to introduce a generic transmission with helical-cut transmission gear wheels and low shaft deflection.

SUMMARY OF THE INVENTION

The invention is based on the knowledge that the axial thrust originating from the helical-cut transmission gear wheels depends, regarding its effective orientation, on the helix angle. It can thus be achieved, by a purposeful alignment of the helical-cut toothing of the transmission gear wheels, that the axial thrust of the gear wheels upon the respective transmission shaft be mutually compensated at least partly.

The invention, accordingly, relates to a transmission having at least one transmission input shaft, at least one countershaft, one reverse gear shaft and at least one transmission output shaft; in which upon at least one transmission input shaft and at least one countershaft, idler gears designed as spur gears are rotatably supported, and fixed gears are fastened which, forming gear pairs, are in tooth contact with each other. In addition, said transmission has available shifting sets located upon the transmission input shaft and upon the countershaft and comprising synchronization and coupling devices by means of which the idler gears can be decelerated to implement a ratio change operation and can be non-rotatably connected with the respectively coordinated shaft. Besides, upon the countershaft is fastened at least one driven gear wheel which meshes with the teeth of a fixed gear upon at least one transmission output shaft.

To solve the stated problem, it is provided, in combination with the features mentioned, that the helix angles of the toothings of the gear wheels that drive the countershaft and the helix angle of the driven gear wheel upon the countershaft be selected so that the toothing forces acting upon the countershaft and the bending torques resulting therefrom dissolve at least in part relative to said shaft.

Especially when several driving gear wheels are situated upon the countershaft, the helix angles of the most overloaded gear wheels, in relation to the toothing of the driven gear wheels, are designed so that the toothing forces acting upon the countershaft and the bending torques resulting therefrom dissolve at least partly with regard to said countershaft.

In development of the invention, the driving forward gear wheels upon the countershaft stricken by the aforementioned helix angle rule are those situated on the countershaft to the right and left sides close to the driven gear wheel and together between two bearings.

In a preferred development of the invention, the transmission is designed so that the driven fixed gear is fastened on the countershaft between one bearing on the side of the clutch and one central bearing, additional idler and fixed gears being situated upon the countershaft behind the central bearing pointing away from the clutch.

Also important is an inventive transmission design in which, based on a coordinate system having axes X, Y, Z at right angles to each other, the output shaft is positioned essentially perpendicular in positive Y direction relative to a plane X-Z stretching between at least one transmission input shaft and at least one countershaft.

In further development of this invention, in addition, it can be provided that in an axis offset of the driven shaft in positive Y direction relative to the plane X-Z between the transmission input shaft and the countershaft, the helix angle of the driving gear wheels inclines to the left on the countershaft when said driving gear wheels are located to the right, that is, in positive X direction adjacent the driven gear wheel.

On the other hand, it is deemed advantageous that in an axis offset of the transmission driven shaft in positive Y direction to the plane X-Z between the transmission input shaft and the countershaft, the helix angle of the driving gear wheels on the countershaft incline to the right when said driving gear wheels are situated to the left, that is, in negative X direction close to the driven gear wheel.

However, the transmission can also be designed so that the driven shaft is disposed essentially perpendicular and in negative Y direction relative to the plane X-Z which stretches between at least one transmission input shaft and at least one countershaft.

In this transmission design, according to the invention, it is advantageous that in an axis offset of the transmission output shaft in negative Y direction to the plane X-Z between the transmission input shaft and the countershaft, the helix angle of the driving gear wheels inclines to the right upon the countershaft when the driving gear wheels are located to the right, that is, in positive X direction close to the driven gear wheel.

In such a transmission, it is purposeful that in case of an axis offset of the transmission output shaft in negative Y direction to the plane X-Z between the transmission input shaft and the countershaft, the helix angle of the driving gear wheels on the countershaft be inclined to the left insofar as the driving gear wheels are disposed to the left, that is, in negative X direction close to the driven gear wheel.

The helix angle of the driven gear wheel on the countershaft can incline, to the left, for example.

A transmission designed, according to the invention, and/or to the developments and improvements thereof, can be constructed as manual or automatic selector transmission with only one starting and gear clutch or as dual-clutch transmission.

The gear sequence in such a transmission, departing from the clutch or dual-clutch, is preferably the following: sixth gear, fourth gear, second gear, reverse gear, first gear, third gear, fifth gear, seventh gear.

The idler gears for the sixth gear and the fourth gear are located on the end close to the clutch, the same as the idler gears for the fifth gear and the seventh gear are located on the end removed from the clutch of at least one transmission input shaft.

BRIEF DESCRIPTION OF THE DRAWINGS

The invention will now be described, by way of example, with reference to the accompanying drawing in which.

DETAILED DESCRIPTION OF THE INVENTION

Figure 1:
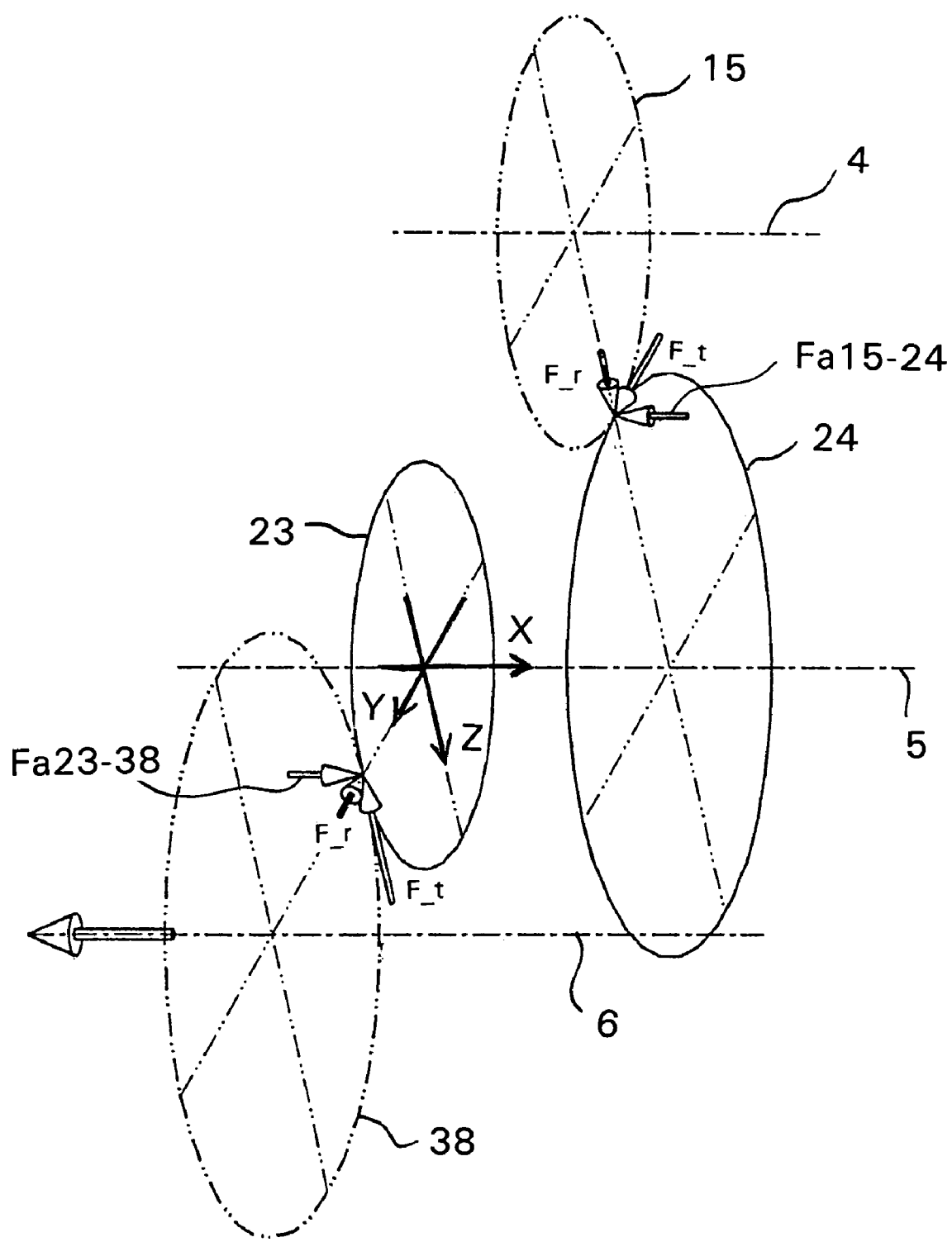
FIG. 1 is a diagrammatic representation of the spatial arrangement of the three main shafts of an inventively designed transmission.

FIG. 1 accordingly shows the spatial arrangement of the three main shafts of a countershaft transmission where one transmission input shaft 4, one countershaft 5 and one output shaft 6 are oriented paraxially with each other so that the transmission input shaft 4 and the countershaft 5 fix between them a plane Z-X relative to which the output shaft 6 is essentially disposed perpendicularly, that is, in positive Y direction.

Upon the transmission input shaft 4 is indicated, by way of example, one fixed gear 15 which is in tooth contract with one idler gear 24 upon the countershaft 5 so that the latter can be driven by the former.

Upon the countershaft 5, to the left of the idler gear 24, is fastened one output gear 23 which meshes with the teeth of a fixed gear 38 connected with the output shaft 6. All said gear wheels 15, 23, 24, 38 are helical-cut spur gear wheels, the helix angles of the gear wheels 23 and 24 being in opposite direction to each other upon the countershaft 5.

As made clear by the forces plotted on the tooth contact points between the gear wheels 15, 24 and 23, 38, axial forces Fa15-24 on the tooth contact point of the gear wheels 15, 24 are exactly oppositely directed and regarding their magnitude substantially as strong as the axial forces Fa23-38 on both gear wheels 23 and 38. Therefore, the axial forces Fa15-24 and Fa23-38 to a great extent dissolve relative to the countershaft 5 so that undesired shaft deflections of the countershaft 5 are prevented according to the problem to be solved. Radial forces $F\_r$ and the tangential forces $F\_t$ remain out of consideration in this representation.

Figure 2:
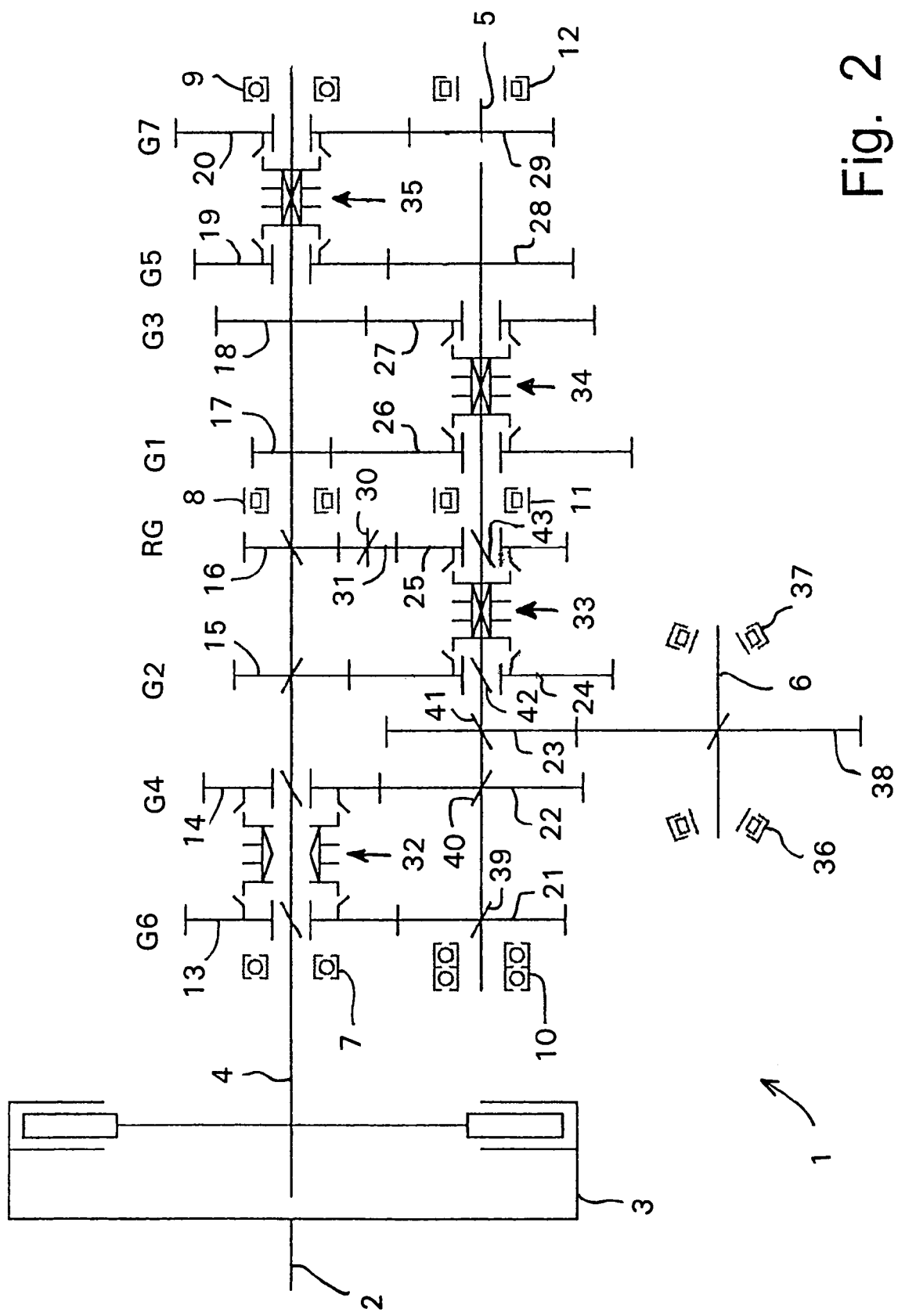
FIG. 2 is a diagrammatic representation of a transmission structure of such a transmission.

Keeping the same reference numerals for the same transmission parts, FIG. 2 shows, as already mentioned, one transmission 1 in countershaft design in which the input side of the single starting and a gear clutch 3 is connected with a drive shaft 2 of a prime mover. The output side of the clutch 3 is non-rotatably connected with the transmission input shaft 4 paraxially with which one countershaft 5 and one transmission output shaft 6 are situated in a transmission housing (not shown).

As shown in FIG. 1, the three main shafts of the transmission are aligned relative to each other so that the transmission input shaft 4 and the countershaft 5 fix the plane X-Z relative to which the transmission output shaft 6 is disposed substantially perpendicularly, that is, emerging from the paper surface of this drawing approximately over the countershaft 5.

Upon the transmission input shaft 4, idler gears 13, 14, 19, 20 are rotatably supported while fixed gears 15, 16, 17 18 are fastened thereon. The gear sequence of said gear wheels, departing from the clutch 3, is as follows: sixth gear G6, fourth gear G4, second gear G2, reverse gear RG, first gear G1, third gear G3, fifth gear G5 and seventh gear G7.

The idler gears 13, 14, 19, 20 of the transmission input shaft 4 are in tooth contact with the fixed gears 21, 22, 28, 29 on the countershaft 5, while the fixed gears 15, 16, 17, 18 of the transmission input shaft 4 drive idler gears 24, 25, 26, 27 on the countershaft 5.

With said idler gears on the transmission input shaft 4 and the countershaft 5 shifting sets 32, 33, 34, 35 are coordinated with the synchronization and coupling means of which the idler gears can be decelerated to the rotational speed of the corresponding transmission shaft 4, 5 and then can be non-rotatably connected with them.

Upon the countershaft 5, between the fixed gear 22 of the fourth gear G4 and the idler gear 24 of the second gear G2, one driven gear wheel 23 is fastened which is in tooth contact with the fixed gear 38 on the output shaft 6.

In addition, one reverse gear shaft 30 is available upon which a reverse gear wheel 31 is fastened. The reverse gear wheel 31 meshes with the reverse fixed gear 16 upon the transmission input shaft 4 and with the reverse gear idler gear 25 on the countershaft 5 so that the reversal of direction of rotation needed for a reverse drive operation is implemented.

As made clear in FIG. 2, the transmission input shaft 4 and the countershaft 5 are respectively supported in the area of their axial ends in roller bearings 7, 9 and 10, 12, while approximately in the center of their longitudinal extension so-called central bearing 8 and 11 are situated. The output shaft 6 is supported in roller bearings 36, 37.

The central bearings 8, 11 divide the idler and fixed gears of the transmission input shaft 4 and of the countershaft 5 in two groups of equal size of forward gear wheels, the driven gear wheel 23 being additionally fastened on the countershaft 5 in the group close to the clutch 3.

For making use of the above mentioned advantages of helical-cut spur gears, there are designed as helical-cut wheels at least the gear wheels in the gear wheel group which are situated on the side near the clutch of the central bearings 8, 11 upon the countershaft 5 and the transmission input shaft 4 in the area of the driven gear wheel 23.

In order to be able now to balance or prevent the axial forces and bending torques resulting therefrom exerted upon said shafts 4, 5 on account of the contact toothing, it is provided, according to the embodiment of FIG. 2, that in the output fixed gear 23 having a helix angle inclined to the left the driving gear wheels 24, 25 disposed to the right close to said driven gear wheel 23, likewise, have a helix angle 42, 43 inclined to the left while the teeth of the driving wheels 21, 22 disposed to the left close to the driven gear wheel 23 have helix angles 39, 40 inclined to the right.

This layout of the helix angles of the driving gear wheels of the countershaft 5 which are disposed axially to the right or left side close to the driven gear wheel 23, produces the compensation of axial forces already explained in relation to FIG. 1 by which the disadvantageous bending torques of the countershaft 5 are extensively prevented.

The gear wheels on the transmission input side 4 in tooth contact with said gear wheels obviously have an opposite helical-cut toothing. An axial force compensation is also achieved here at least in part.

If the driven gear wheel 23 were situated on the countershaft 5 on the side remote from the clutch behind the central bearing 11, then the right and left side gear wheels of that place on the transmission input shaft 4 and the countershaft 5 would have with reference to the driven gear wheel 23, as described above, an opposite helix angle according to the inventive construction principle.

REFERENCE NUMERALS 1 transmission
2 crankshaft
3 starting and gear clutch
4 transmission input shaft
5 countershaft
6 output shaft
7 bearing
8 bearing
9 bearing
10 bearing
11 bearing
12 bearing
13 idler gear
14 idler gear
15 fixed gear
16 fixed gear
17 fixed gear
18 fixed gear
19 idler gear
20 idler gear
21 fixed gear
22 fixed gear
23 driven fixed gear on the countershaft
24 idler gear
25 idler gear
26 idler gear
27 idler gear
28 fixed gear
29 fixed gear
30 reverse gear shaft
31 reverse gear gear wheel
32 shifting set
33 shifting set
34 shifting set
35 shifting set
36 bearing
37 bearing
38 fixed gear on output shaft
39 helix angle
40 helix angle
41 helix angle
42 helix angle
43 helix angle
$F_a$ axial force on tooth contact point
$F\_r$ radial force on tooth contact point
$F\_t$ tangential force on tooth contact point

The invention claimed is:

1. A transmission (1) having at least one transmission input shaft (4), at least one counter shaft (5), one reverse gear shaft (30) and at least one transmission output shaft (6) in which, upon the at least one transmission input shaft (4) and the at least one countershaft (5) idler gear wheels (13, 14, 19, 20, 24, 25, 26, 27), designed as helical-cut spur gears, are rotatably supported and fixed gear wheels (15, 16, 17, 18, 21, 22, 28, 29) are fastened for forming gear pairs with each other, and having shifting sets (32, 33, 34, 35) situated upon the transmission input shaft (4) and the countershaft (5) and comprising synchronization and coupling devices by which the idler gear wheels (13, 14, 19, 20, 24, 25, 26, 27) can be decelerated to implement a ratio change operation and can be non- rotatably connected respectively coordinated with the transmission input shaft (4) or the countershaft (5), at least one driven gear wheel (23) upon the at least one countershaft (5) meshes with teeth of a fixed gear wheel (38) on the at least one transmission output shaft (6), and wherein helix angles (39, 40, 42, 43) of the toothing of the fixed and idler gear wheels (21, 22, 24, 25) are positioned axially opposing one another on either side of the driven gearwheel (23) driving the countershaft (5), and a further helix angle (41) of the driven gear wheel (23) and the helix angles (39, 40, 42, 43) of the fixed and idler gear wheels (21, 22, 24, 25) are selected so that axial forces, generated by the helix angles (39, 40, 42, 43) of the fixed and idler gear wheels (21, 22, 24, 25) and acting upon the countershaft (5) during operation of the transmission, substantially cancel each other out.

2. The transmission according to claim 1, wherein in the gear wheels (21, 22, 24, 25) on the countershaft (5), the helix angles (40, 42) of the gear wheels (22, 24, or G2, G4) are designed so that toothing forces and bending torques are opposed.

3. The transmission according to claim 1, wherein the gear wheels (22, 24) are oppositely disposed to a right and left side of the driven gear wheel (23) and positioned between two bearings (10, 11) on the countershaft (5).

4. The transmission according to claim 1, wherein the driven gear wheel (23) is fastened on the countershaft (5) between one bearing (10) adjacent a clutch side of the transmission and one central bearing (11), additional idler and fixed gear wheels (26, 27, 28, 29) being situated on the countershaft (5) behind the central bearing (11) up to a clutch side remote bearing (12).

5. The transmission according to claim 1, wherein the transmission is one of a manual and automatic transmission comprising one of a single-clutch and a dual-clutch transmission.

6. The transmission according to claim 1, wherein the gear wheels in the transmission (1) are disposed so that a gear sequence, departing from a starting element (a clutch or dual-clutch) is as follows: sixth gear (G6), forth gear (G4), second gear (G2), reverse gear (RG), first gear (G1), third gear (G3), fifth gear (G5), seventh gear (G7).

7. The transmission according to claim 1, wherein the idler gears (13, 14) fpr a sixth (G6) and a fourth gear (G4), are positioned on the input shaft closest to a starting element and the idler gears (19, 20) for a fifth gear (G5) and a seventh gear (G7) are located on an end of the input shaft (4) remote from the starting element.

8. The transmission according to claim 1 wherein, based on a coordinate system with axes X, Y, Z perpendicular to each other, the output shaft (6) is situated essentially perpendicularly to a plane (X-Z) stretching between the at least one transmission input shaft (4) and the at least one countershaft (5).

9. The transmission according to claim 8, wherein in an axis offset of the transmission output shaft (6) in a positive Y direction to the plane (X-Z) between the transmission input shaft (4) and the countershaft (5), the helix angles (42, 43) of the idler gear wheels (24, 25) upon the countershaft (5) inclines to the left when said idler gear wheels (24, 25) are situated to the right (in positive X direction) close to the driven gear wheel (23).

10. The transmission according to claim 8, wherein in an axis offset of the transmission output shaft (6) in positive Y direction to the plane (X-Z) between the transmission input shaft (4) and the countershaft (5), the helix angles (39, 40) of the fixed gear wheels (21, 22) inclines to the right on the countershaft (5) when said fixed gear wheels (21, 22) are situated to the left (in negative X direction) close to the driven gear wheel (23).

11. The transmission according to claim 8, wherein in an axis offset of the transmission output shaft (6) in a negative Y direction to the plane (X-Z) between the transmission input shaft (4) and the countershaft (5), the helix angles of the fixed gear wheels (21, 22) on the countershaft (5) inclines to the left when said fixed gear wheels (21, 22) are situated to the left (in negative X direction close to the driven gear wheel (23).

12. The transmission according to claim 8, wherein in an axis offset of the transmission output shaft (6) in a negative Y direction to the plane (X-Z) between the transmission input shaft (4) and the countershaft (5), the helix angles of the idler gear wheels (24, 25) on the countershaft (5) inclines to the right when said idler gear wheels (24, 25) are situated to the right (in positive X direction close to the driven gear wheel (23).

13. The transmission according to claim 12, wherein the helix angle (41) of the driven gear wheel (23) inclines to the left.

14. A transmission (1) comprising:

at least one transmission input shaft (4), at least one countershaft (5), one reverse gear shaft (30) and at least one transmission output shaft (6);

a plurality of idler gear wheels (13, 14, 19, 20, 24, 25, 26, 27), designed as helical-cut spur gears, are rotatably supported upon the at least one transmission input shaft (4) and the at least one countershaft (5);

a plurality of fixed gear wheels (15, 16, 17, 18, 21, 22, 28, 29) are non-rotatably supported upon the at least one transmission input shaft (4) and the at least one countershaft (5) for forming gear pairs with the plurality of idler gear wheels;

a plurality of shifting sets (32, 33, 34, 35) situated upon the transmission input shaft (4) and the countershaft (5), the shifting sets comprising synchronization and coupling devices by which the idler gear wheels (13, 14, 19, 20, 24, 25, 26, 27) can be non-rotatably connected with one of the transmission input shaft (4) and the countershaft (5);

at least one driven gear wheel (23) supported upon the at least one countershaft (5) which meshes with teeth of a fixed gear wheel (38) on the at least one transmission output shaft (6) and helix angles (39, 40, 42, 43) of the toothing of the fixed and idler gear wheels (21, 22, 24, 25), and a further helix angle (41) of the driven gear wheel (23) are selected so that axial forces, generated by the helix angles (39, 40, 42, 43) of the fixed and idler gear wheels (21, 22, 24, 25) and acting upon the countershaft (5) during operation of the transmission, substantially cancel each other out; and wherein on the countershaft (5) first and second gear wheels of the gear wheels (21, 22, 24, 25) axially positioned on a first side of the driven gear wheel (23) each has a right-handed helix angle, and third and fourth gear wheels of the gear wheels (21, 22, 24, 25) each comprises left-handed helix angle axially positioned on a second side of the driven gear wheel (23) to oppose the toothing forces and bending forces of the first and second gear wheels.

15. A transmission (1) comprising:

at least one transmission input shaft (4), at least one countershaft (5), one reverse gear shaft (30) and at least one transmission output shaft (6);

a plurality of idler gear wheels (13, 14, 19, 20, 24, 25, 26, 27), designed as helical-cut spur gears, are rotatably supported upon the at least one transmission input shaft (4) and the at least one countershaft (5);

a plurality of fixed gear wheels (15, 16, 17, 18, 21, 22, 28, 29) are non-rotatably supported upon the at least one transmission input shaft (4) and the at least one countershaft (5) for forming gear pairs with the plurality of idler gear;

a plurality of shifting sets (32, 33, 34, 35) situated upon the transmission input shaft (4) and the countershaft (5), the shifting sets comprising synchronization and coupling devices by which the idler gear wheels (13, 14, 19, 20, 24, 25, 26, 27) can be non-rotatably connected with one of the transmission input shaft (4) and the countershaft (5);

at least one driven gear wheel (23) supported upon the at least one countershaft (5) which meshes with teeth of a fixed gear wheel (38) on the at least one transmission output shaft (6), and helix angles (39, 40, 42, 43) of the toothing of the fixed and idler gear wheels (21, 22, 24, 25) positioned axially opposing one another on either side of the driven gear wheel (23) and a further helix angle (41) of the driven gear wheel (23) are selected so that axial forces, generated by the helix angles (39, 40, 42, 43) of the fixed and idler gear wheels (21, 22, 24, 25) and acting upon the countershaft (5) during operation of the transmission, substantially cancel each other out; and the idler gear wheels (13, 14) for a sixth gear (G6) and a fourth gear (G4) are positioned on the input shaft (4) closest to a clutch, and the idler gear wheels (19, 20) for a fifth gear (G5) and a seventh gear (G7) are located on an end of the input shaft (4) remote from the clutch.

* * * * *